United States Patent
Lee et al.

(10) Patent No.: US 9,785,269 B2
(45) Date of Patent: Oct. 10, 2017

(54) LIQUID CRYSTAL DISPLAY PANEL HAVING DUMMY GATE LINE FOR APPLYING DUMMY GATE PULSE AND LIQUID CRYSTAL DISPLAY DEVICE USING THE SAME

(71) Applicant: LG DISPLAY CO., LTD., Seoul (KR)

(72) Inventors: Sangho Lee, Paju-si (KR); YoungHyoung Seo, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/955,874

(22) Filed: Dec. 1, 2015

(65) Prior Publication Data

US 2016/0162087 A1    Jun. 9, 2016

(30) Foreign Application Priority Data

Dec. 3, 2014    (KR) ......................... 10-2014-0172338

(51) Int. Cl.
  *G06F 3/041*    (2006.01)
  *G09G 3/36*    (2006.01)
  *G02F 1/1333*    (2006.01)
  *G02F 1/1362*    (2006.01)
  *G06F 3/047*    (2006.01)
  *G06F 3/044*    (2006.01)

(52) U.S. Cl.
  CPC ........ *G06F 3/0412* (2013.01); *G02F 1/13338* (2013.01); *G02F 1/136286* (2013.01); *G06F 3/047* (2013.01); *G06F 3/0416* (2013.01); *G09G 3/3648* (2013.01); *G09G 3/3677* (2013.01); *G09G 2300/0413* (2013.01); *G09G 2320/0219* (2013.01); *G09G 2354/00* (2013.01)

(58) Field of Classification Search
  CPC .. G09G 3/3688; G09G 3/3677; G09G 3/3648; G06F 3/044; G06F 3/0412; G06F 3/0416; G06F 3/047; G02F 1/13338; G02F 1/136286
  USPC ........................................ 345/173; 178/18.06
  See application file for complete search history.

(56) References Cited

U.S. PATENT DOCUMENTS

| | | | | |
|---|---|---|---|---|
| 2008/0111933 A1* | 5/2008 | Lee | ...................... | G02F 1/13306 349/38 |
| 2012/0113067 A1* | 5/2012 | Zhao | ..................... | G09G 3/3648 345/204 |
| 2012/0154699 A1* | 6/2012 | Yu | ........................ | G09G 3/3648 345/204 |
| 2012/0162121 A1 | 6/2012 | Chang et al. | | |
| 2013/0257765 A1 | 10/2013 | Lee et al. | | |
| 2014/0118277 A1 | 5/2014 | Kim et al. | | |
| 2014/0327632 A1* | 11/2014 | Roudbari | ................ | G06F 3/044 345/173 |
| 2016/0103514 A1* | 4/2016 | He | .......................... | G06F 3/044 345/174 |

(Continued)

FOREIGN PATENT DOCUMENTS

| | | |
|---|---|---|
| CN | 103728762 A | 4/2014 |
| CN | 103793118 A | 5/2014 |

*Primary Examiner* — Adam J Snyder
(74) *Attorney, Agent, or Firm* — Dentons US LLP

(57) ABSTRACT

A liquid crystal display panel and a liquid crystal display device having the liquid crystal display panel are provided in which a dummy gate line outputting a dummy gate pulse having an inverted waveform of gate pulse is formed to be parallel to gate lines outputting the gate pulses and to be perpendicular to touch electrodes supplied with a common voltage.

18 Claims, 5 Drawing Sheets

(56) References Cited

U.S. PATENT DOCUMENTS

2016/0253010 A1    9/2016  Xu

* cited by examiner

LIQUID CRYSTAL DISPLAY PANEL HAVING DUMMY GATE LINE FOR APPLYING DUMMY GATE PULSE AND LIQUID CRYSTAL DISPLAY DEVICE USING THE SAME

CROSS-REFERENCE TO RELATED APPLICATIONS

This application claims the benefit of the Korean Patent Application No. 10-2014-0172338 filed on Dec. 3, 2014, which is hereby incorporated by reference for all purposes as if fully set forth herein.

BACKGROUND

Field of Technology

The present disclosure relates to a liquid crystal display panel having a touch panel and a liquid crystal display device using the liquid crystal display panel having the touch panel.

Discussion of the Related Art

A touch panel is mounted on a display device such as a liquid crystal display device (LCD), a plasma display panel (PDP), an organic light emitting display device (OLED), or an electrophoretic display device (EPD).

A method of manufacturing a liquid crystal display device having a touch panel can be classified into two types: an add-on type in which a display panel and a touch panel configured to sense a touch screen operations are separately manufactured and then bonded, and an in-cell type in which a touch panel is built into a display panel.

FIG. 1 is a diagram illustrating a liquid crystal display device according to the related art having an in-cell type touch panel, and FIG. 2 is a diagram illustrating waveforms of signals which are applied to the liquid crystal display device according to the related art having an in-cell type touch panel.

Referring to FIG. 1, the liquid crystal display device according to the related art having an in-cell type touch panel includes a liquid crystal display panel 50 wherein touch electrodes, which are also used as common electrodes, are formed. A touch sensing unit 60 drives the touch electrodes, which include driving electrodes TX and receiving electrodes RX. Each of the driving electrodes TX is formed in a line shape and the receiving electrodes RX is formed in a line shape (or island type jumping line shape). Gate lines are formed in the liquid crystal display device 50 so as to overlap the receiving electrodes RX formed in a horizontal (or row) direction of the liquid crystal display device 50.

A common voltage is supplied to the driving electrodes TX and the receiving electrodes RX during an image display period in which an image is displayed. Touch drive signals are sequentially supplied to the driving electrodes TX during a touch sensing period in which a touch contact or operation is sensed, and the receiving electrodes RX transmit sensing signals to the touch sensing unit 60.

When the supplied voltages are non-uniform through the driving electrodes and the receiving electrodes, uneven brightness patterns may be displayed on the screen, whereby stripes or lines may be seen along the driving electrodes and the receiving electrodes. Also, striped patterns may be observed as dimmed stripes or brightened stripes depending on the voltage deviation.

For example, in the display device illustrated in FIG. 1, the receiving electrodes RX are formed to be parallel to and overlap with the gate lines.

When gate pulses are supplied to the gate lines during the image display period, parasitic capacitance may be generated between the gate lines and the driving electrodes TX and also between the gate lines and the receiving electrodes RX.

In this case, a voltage level difference between the common voltage supplied to the driving electrodes TX and the common voltage supplied to the receiving electrodes RX may occur, and a potential difference between pixel voltages charged at pixel electrodes and common voltages charged at common electrodes formed on the panel 50 may occur due to the common voltage deviation. Accordingly, vertical striped patterns may appear on the screen along the driving electrodes TX.

The above-mentioned striped patterns may appear along the receiving electrodes RX in the horizontal direction.

However, in general, the striped patterns appearing along the driving electrodes TX are more visible due to their arrangement being perpendicular to the gate lines, as opposed to the striped patterns appearing along the receiving electrodes RX which are arranged to be parallel to the gate lines.

As such, if the driving electrodes TX are arranged along the gate lines in the horizontal direction of the liquid crystal display panel 50 and the receiving electrodes RX are arranged to be perpendicular to the gate lines in the vertical direction of the liquid crystal display panel 50, undesirable patterns or stripes appearing in the vertical direction along the receiving electrodes RX may be more conspicuous.

The reason why the striped patterns appear on the liquid crystal display device having an in-cell type touch panel according to the related art will be described below with reference to FIG. 2.

When a gate pulse GP is supplied to a gate line during the image display period, a data voltage Vdata is supplied to pixels which are corresponding to the gate line and a common voltage Vcom is supplied to the driving electrode TX and the receiving electrode RX. A pixel voltage corresponding to the difference between the data voltage Vdata and the common voltage Vcom is applied to the liquid crystal to control the light transmittance thereof.

When the gate pulse GP falls, the data voltage Vdata and the common voltage Vcom initially fall and then rise again due to a coupling effect. The magnitude of the data voltage Vdata from falling to rising is different from the magnitude of the common voltage Vcom from falling to rising. Accordingly, a pixel voltage Vp1 of an interval in which the gate pulse is in a high state is different from a pixel voltage Vp2 of an interval in which the gate pulse is in a low state.

Referring to FIG. 1, the pixel voltage difference Vp2−Vp1 between the pixels corresponding to the driving electrode TX which is formed to be perpendicular to the gate line is different from the pixel voltage difference Vp2−Vp1 between the pixels corresponding to the receiving electrode RX which is formed to be parallel to the gate line.

A difference in luminance between the pixels corresponding to the driving electrode TX and pixels corresponding to the receiving electrode RX occurs due to the above-mentioned difference, and striped patterns appear in the horizontal (row) or the vertical (column) direction of the liquid crystal display panel 50.

Particularly, since the pixel voltage difference Vp2−Vp1 between the pixels corresponding to the driving electrode TX which is formed to be perpendicular to the gate line is greater than the pixel voltage difference Vp2−Vp1 between the pixels corresponding to the receiving electrode RX which is formed to be parallel to the gate line, striped patterns appearing in the vertical direction perpendicular to the gate line are more conspicuous.

SUMMARY

The present disclosure addresses the above-mentioned problems. The present disclosure provides a liquid crystal display panel in which a dummy gate line that outputs a dummy gate pulse having an inverted waveform of a gate pulse is formed to be parallel to a gate line outputting the gate pulse and to be perpendicular to a touch electrode to which a common voltage is supplied, and a liquid crystal display device using the liquid crystal display panel.

According to an aspect of the present disclosure, there is provided a liquid crystal display device including: gate lines that are supplied with gate pulses; data lines that are supplied with data voltages; first touch electrodes which are parallel to the gate lines and serve as a common electrode and a touch electrode; second touch electrodes which are perpendicular to the gate lines and serve as a common electrode; and a touch sensor, and at least one dummy gate line which is parallel to the gate lines.

According to the aspect of the present disclosure, whenever a gate pulse is output to the gate lines, a dummy gate pulse having an inverted waveform of the gate pulse is output to a dummy gate line which is formed to be parallel to the gate lines.

As a result, it is possible to reduce a variation of the common voltage which is supplied to the touch electrodes formed to be perpendicular to the gate lines, and to reduce a variation of the pixel voltage of the pixels which are formed to overlap the touch electrodes.

Accordingly, striped patterns do not appear along the touch electrodes which are formed to be perpendicular to the gate lines.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention. In the drawings.

DETAILED DESCRIPTION OF THE ILLUSTRATED EMBODIMENTS

Hereinafter, an embodiment of the present disclosure will be described in details with reference to the accompanying drawings.

Figure 1:
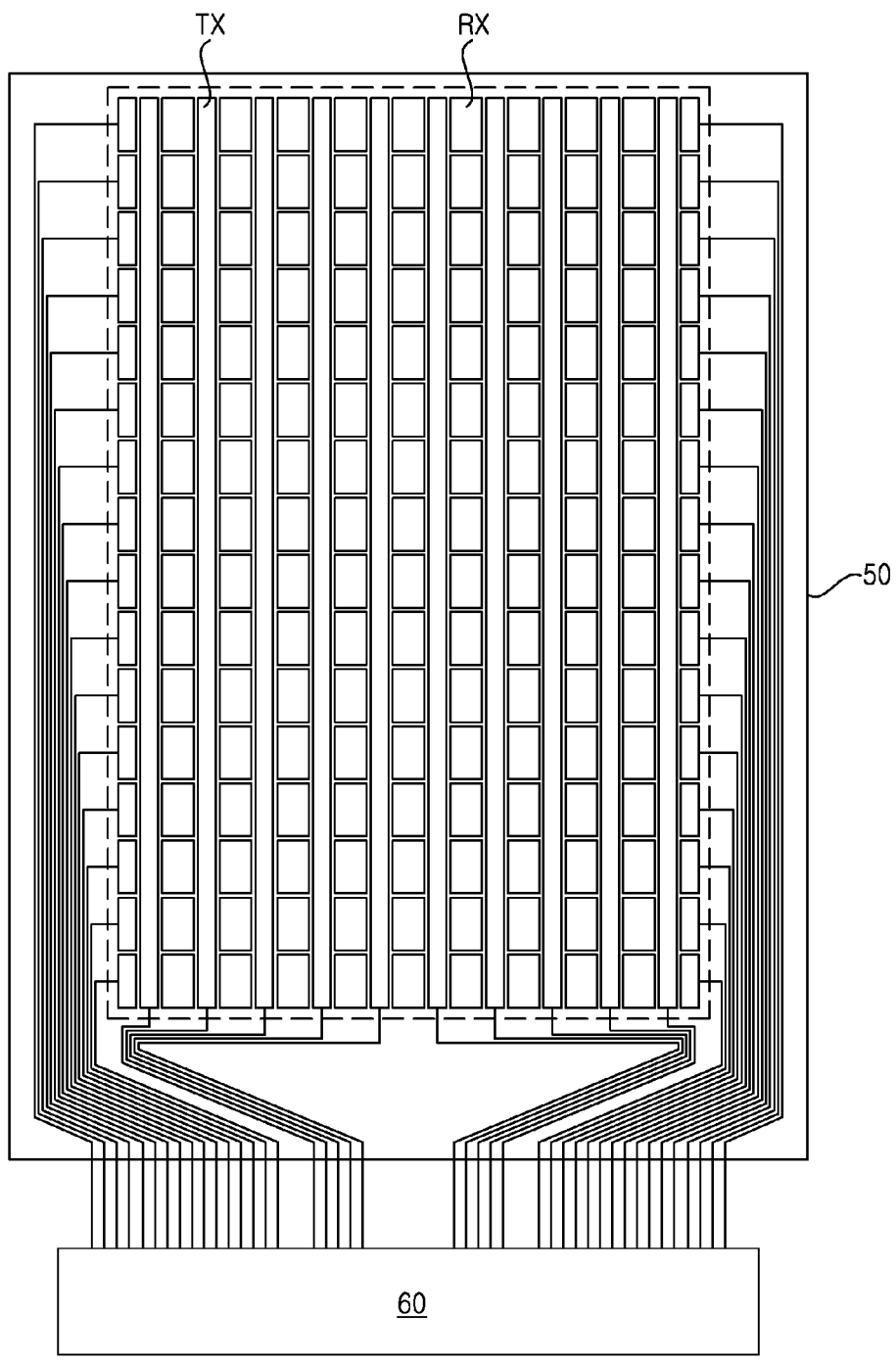
FIG. 1 is a diagram illustrating a liquid crystal display device according to the related art having an in-cell type touch panel.
Figure 2:
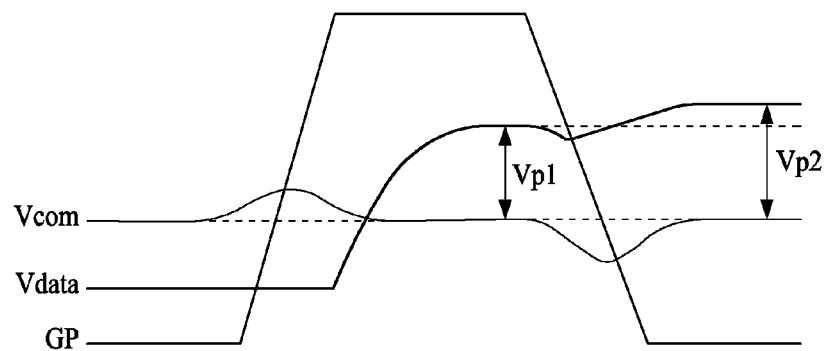
FIG. 2 is a diagram illustrating waveforms of signals which are applied to the liquid crystal display device according to the related art having an in-cell type touch panel.
Figure 3:
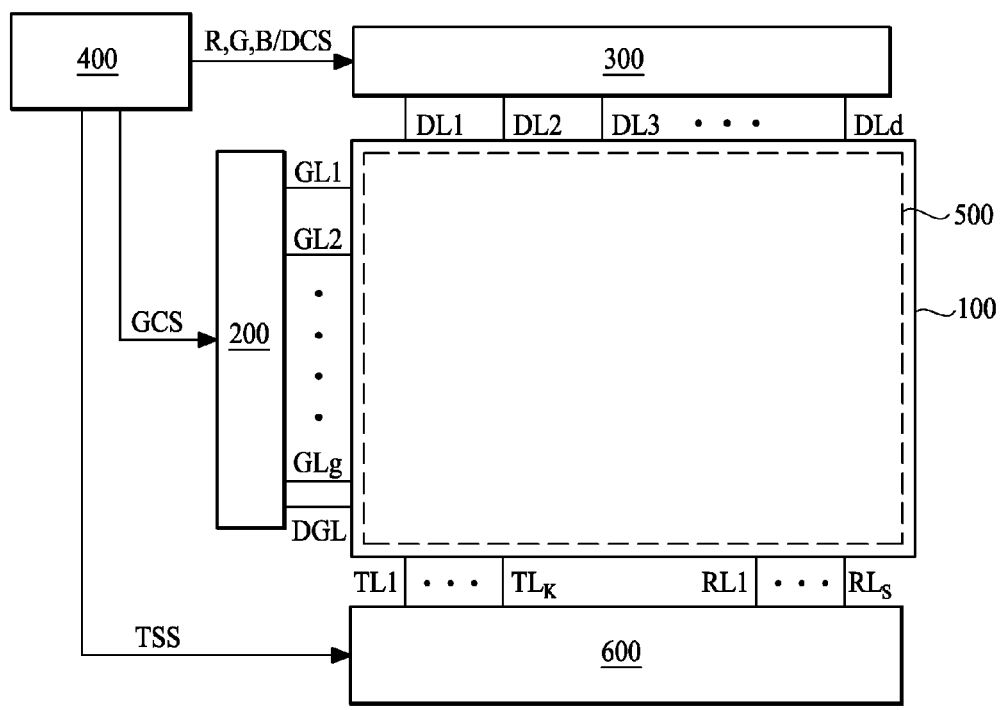
FIG. 3 is a diagram schematically illustrating a configuration of a display device according to an embodiment of the present disclosure.

FIG. 3 is a diagram illustrating a configuration of a display device according to an embodiment of the present disclosure.

The display device according to an embodiment of the present disclosure includes a liquid crystal display panel 100 that includes gate lines GL1 to GLg, data lines DL1 to DLd, first touch electrodes parallel to the gate lines, second touch electrodes perpendicular to the gate lines, and at least one dummy gate line DGL parallel to the gate lines, a touch sensing unit 600 that supplies a common voltage to the first touch electrodes and the second touch electrodes during an image display period and that sequentially supplies a touch drive signal to the first touch electrodes or the second touch electrodes, receives sensed signals from the first touch electrodes or the second touch electrodes, and determines whether a touch is given or not in a touch sensing period, a gate driver 200 that sequentially outputs gate pulses to the gate lines and outputs dummy gate pulses having an inverted waveform (e.g. a waveform opposite to the gate pulse GP) of the gate pulses to a dummy gate line DGL whenever the gate pulses are output to the gate lines, a data driver 300 that supplies data voltages to the data lines DL1 to DLd, and a timing controller 400 that controls the gate driver 200 and the data driver 300. The first touch electrodes and the second touch electrodes are collectively referred as a touch panel 500.

First, the liquid crystal display device 100 is formed by bonding a first substrate with a second substrate. An interlayer is formed between the first substrate and the second substrate.

The first substrate and the second substrate can be made of glass, plastic, metal, or the like. The interlayer includes liquid crystal.

On the first substrate, the data lines DL1 to DLd, the gate lines GL1 to GLg, Thin Film Transistors (TFT) for each of the pixels formed on the liquid crystal display panel, pixel electrodes that are formed in the pixels and charge the pixels with the data voltage, and common electrodes that drive the pixel electrodes and liquid crystal are formed.

The pixels are arranged in a matrix form with respect to the data lines DL1 to DLd and the gate lines GL1 to GLg that cross each other, and the TFT, the pixel electrode, and the common electrode are formed in each of the pixels.

A gate pulse is supplied to each of the gate lines from the gate driver 200, and a data voltage is supplied to each of the data lines from the data driver 300.

On the first substrate, first touch electrodes parallel to the gate lines GL1 to GLg, second touch electrodes perpendicular to the gate lines GL1 to GLg, and at least one dummy gate line parallel to the gate lines GL1 to GLg are arranged.

Each of the first touch electrodes and the second touch electrodes serves as a common electrode and a touch sensor.

For example, a common voltage is supplied to the first touch electrodes and the second touch electrodes in an image display period. A touch drive signal is sequentially supplied to the first touch electrodes or the second touch electrodes.

The first touch electrodes or the second touch electrodes transmit the sensed signal to the touch sensing unit 600.

The first touch electrodes and the second touch electrodes are electrically connected to the touch sensing unit 600 via touch electrode lines TL1 to TLk and RL1 to RLs.

The dummy gate line DGL is formed to be parallel to the gate lines, and a dummy gate pulse is supplied to the dummy gate line DGL from the gate driver 200. The dummy gate line DGL is formed to overlap the second touch electrodes via an insulating film arranged therebetween.

The dummy gate line DGL can be arranged in the outermost side of a display area of the liquid crystal display panel, or can be arranged inside of the display area.

Second, the timing controller 400 receives a timing signal such as a data enable signal DE, a dot clock CLK from an outer system, and generates control signals GCS and DCS for controlling the operation timing of the data driver 300 and the gate driver 200. Furthermore, the timing controller 400 re-arranges an input image data supplied from the outer system, and outputs the re-arranged image data R, G, and B to the data driver 300. The timing controller 400 can also generate a touch synchronous signal (TSS) for controlling the operation timing of the touch sensing unit 600 to control the touch sensing unit 600.

For example, when the touch panel (i.e., the first touch electrode and the second touch electrode) is built into or integrated with the liquid crystal display panel 100, the timing controller 400 can generate and transmit the touch synchronous signal (TCS) to the touch sensing unit 600 to repeat an image display period in which an image is displayed and a touch sensing period in which a touch is sensed.

Third, the data driver 300 converts the image data supplied from the timing controller 400 into a data voltage, and supplies one horizontal line amount of the data voltage to the data line, every one horizontal period in which a gate pulse is supplied to the gate line.

For example, the data driver 300 converts the image data into a data voltage by using a gamma voltage supplied from a gamma voltage generating unit, and outputs the data voltage to the data lines.

Fourth, the gate driver 200 shifts a gate start pulse that is transmitted from the timing controller 400 according to a gate shift clock, and sequentially supplies the gate pulse to the gate lines GL1 to GLg.

The data driver 300, the gate driver 200, and the timing controller 400 are described to be independent of each other, but at least one of the data driver 300 and the gate driver 200 may be included in or integrated with the timing controller 400.

Fifth, the touch sensing unit 600 carries out a function of sensing a touch contact or operation on the touch panel 500 by using sensed signals transmitted from the touch panel 500.

The touch panel 500, which includes the first touch electrode and the second touch electrode support capacitance based touch detection, is formed in the liquid crystal display panel 100.

Particularly, the touch panel 500 is configured as a so-called mutual type touch panel. The mutual type touch panel 500 includes driving electrodes that are supplied with touch drive signal, and receiving electrodes that transfer the sensed signals generated by the touch drive signal to the touch sensing unit 600.

When the first touch electrode serves as the driving electrode, the second touch electrode serves as the receiving electrode. Alternatively, when the first touch electrode serves as the receiving electrode, the second touch electrode serves as the driving electrode.

The first touch electrode and the second touch electrode are electrically connected to the touch sensing unit 600 via touch electrode lines TK1 to TLk and RL1 to RLs.

The first touch electrode and the second touch electrode carry out a function of the common electrode during the image display period and a function of the touch panel during the touch sensing period.

Accordingly, the touch sensing unit 600 supplies a common voltage to the first touch electrodes and the second touch electrodes during the image display period, and sequentially supplies touch drive signals to the first touch electrodes or the second touch electrodes, receives the sensed signal from the first touch electrodes or the second touch electrodes, and determines whether a touch contact or operation has occurred or not during the touch sensing period.

The configuration and the function of the touch sensing unit 600 can be equally applied to the configuration and functions of a touch sensing unit that is applied to an in-cell type liquid crystal display device. Accordingly, the detailed description on the configuration and the function of the touch sensing unit 600 will be omitted.

The touch sensing unit 600, referring to FIG. 3, may be configured separately from the timing controller 400 and the data driver 300, but may be included in or integrated with the timing controller 400 or the data driver 300.

Figure 4:
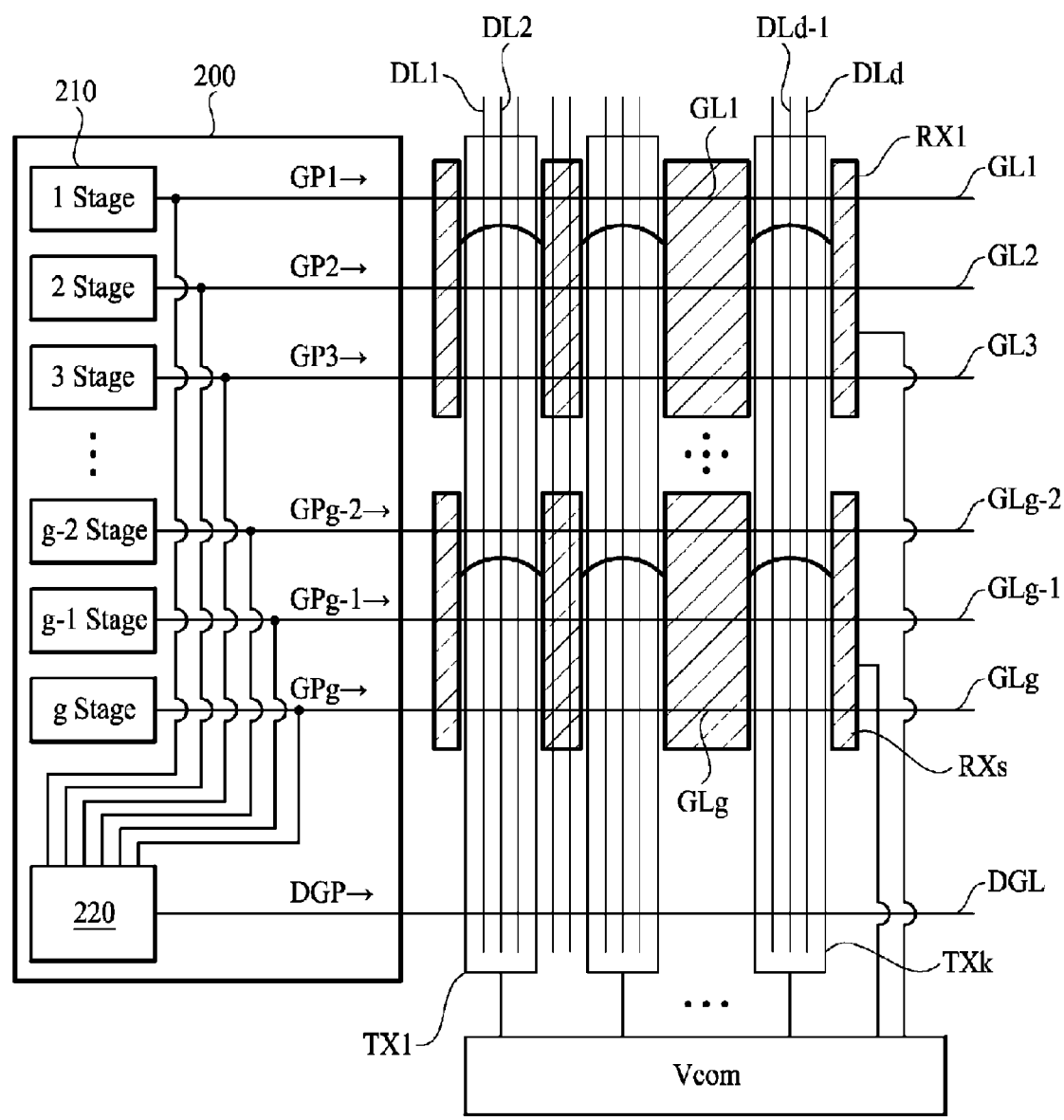
FIG. 4 is a diagram illustrating configurations of a gate driver and a touch panel which are applied to a liquid crystal display device according to an embodiment of the present disclosure.

FIG. 4 is a diagram illustrating configurations of a gate driver and a touch panel that are applied to a liquid crystal display device according to embodiments of the present invention.

As described with reference to FIG. 3, the liquid crystal display device according to an embodiment of the present disclosure includes the gate driver 200, the data driver 300, the timing controller 400, and the touch sensing unit 600.

In the liquid crystal display panel 100, the gate lines GL1 to GLg, the data lines DL1 to DLd, first touch electrodes parallel to the gate lines GL1 to GLg, second touch electrodes perpendicular to the gate lines, and at least one dummy gate line DGL parallel to the gate lines GL1 to GLg are arranged.

As described above, when the first touch electrodes serve as the driving electrodes, the second touch electrodes serve as the receiving electrodes. Alternatively, when the first touch electrodes serve as the receiving electrodes, the second touch electrodes serve as the driving electrodes.

Hereinafter, for the purpose of convenience of explanation, referring to FIG. 4, the liquid crystal display device according to another embodiment of the present disclosure will be described by considering the case where the first touch electrodes parallel to the gate lines GL1 to GLg serve as the receiving electrodes RX1 to RXs and the second touch electrodes perpendicular to the gate lines GL1 to GLg serve as the driving electrodes TX1 to TXk.

In such case, the driving electrodes TX1 to TXk are connected to the touch sensing unit 600 via the driving electrode lines TL1 to TLk of the touch electrode lines TL1 to TLk and RL1 to RLs, and the receiving electrodes RX1 to RXs are connected to the touch sensing unit 600 via the receiving electrode lines RL1 to RLs of the touch electrode lines TL1 to TLk and RL1 to RLs.

The gate driver 200 sequentially outputs gate pulses GP1 to GPg to the gate lines GL1 to GLg during the image display period, and outputs dummy gate pulses (DGP) having inverted waveforms of the gate pulses GP1 to GPg to the dummy gate line DGL whenever the gate pulses GP1 to GPg are output to the gate lines GL1 to GLg.

The first touch electrodes, that is, the receiving electrodes RX1 to RXs that are formed to be parallel to the gate lines can be formed to overlap at least one of the gate lines GL1 to GLg.

For example, the receiving electrodes RX1 to RXs overlapped with three gate lines are illustrated in FIG. 4.

The second touch electrodes, that is, the driving electrodes TX1 to TXk that are formed to be parallel to the data lines can be formed to overlap at least one of the data lines DL1 to DLd. For example, the driving electrodes TX1 to TXk overlapped with three data lines are illustrated in FIG. 4.

The dummy gate line DGL is arranged to overlap the driving electrodes TX1 to TXk. For example, the dummy gate line DGL may be arranged in the outermost side of a display area of the liquid crystal display panel. In this case, the dummy gate line DGL may be arranged in the upper end of the display area of the liquid crystal display panel 100 or in the lower end of the display area, referring to FIG. 4, to overlap the upper parts or the lower parts of the driving electrodes TX1 to TXk.

The dummy gate line DGL may be arranged inside the display area. For example, the dummy gate line DGL may be arranged between the nth gate line and the (n+1)th gate line (where n is a natural number and smaller than g) of the gate lines illustrated in FIG. 4.

Two or more of the dummy gate lines DGL can be formed in the liquid crystal display panel 100. In this case, at least two dummy gate lines DGL may be adjacent to each other. Or at least one gate line is interposed between the dummy gate lines.

Referring to FIG. 4, the gate driver 200 includes stages 210 (or shift registers) sequentially outputting the gate pulses GP1 to GPg to the gate lines GL1 to GLg and at least one dummy stage 220 outputting the dummy gate pulse DGP.

Each of the stages 210 is driven by a gate pulse output from the preceding stage, and outputs a gate pulse to a gate line which is connected thereto.

The order in which the gate pulses are output to the gate lines can be changed. For example, sequential manner, reverse sequential manner or bi-directional sequential manner.

The configurations and functions of the stages 210 may be the same as the configurations and functions of stages included in a gate driver which is currently in common use, and thus the detailed description thereof will be omitted.

The dummy stage 220 can invert the gate pulses GP1 to GPg output from 1st stage to gth stage to generate the dummy gate pulse DGP.

For this purpose, referring to FIG. 4, the dummy stage 220 can be connected to output terminals of the stages and be configured as an inverter for inverting the gate pulse.

In addition, when a first gate pulse GP1 is output to a first gate line GL1, the first gate pulse GP1 is also transmitted to the dummy stage 220. The dummy stage 220 inverts the first gate pulse GP1 to generate a first dummy gate pulse having an inverted waveform of the first gate pulse GP1 and then outputs the first dummy gate pulse to the dummy gate line DGL. The inverted waveform of the first gate pulse GP1 may be referred as a gate pulse compensation pulse or a de-coupling waveform.

As the dummy gate line GDL overlaps all the driving electrodes TX1 to TXk, the first dummy gate pulse affects the driving electrodes.

Accordingly, the coupling effect of the first gate pulse GP1 that affects the driving electrodes is cancelled, neutralized or de-coupled by the coupling effect of the first dummy gate pulse that affects the driving electrodes. As a result, a variation of the pixel voltage due to a variation of the common voltage supplied to the driving electrodes is reduced, minimized or does not occur. As a result, striped patterns are not shown or effectively suppressed on the display screen when the luminance of pixels overlapped with the driving electrodes increases or decreases.

Figure 5:
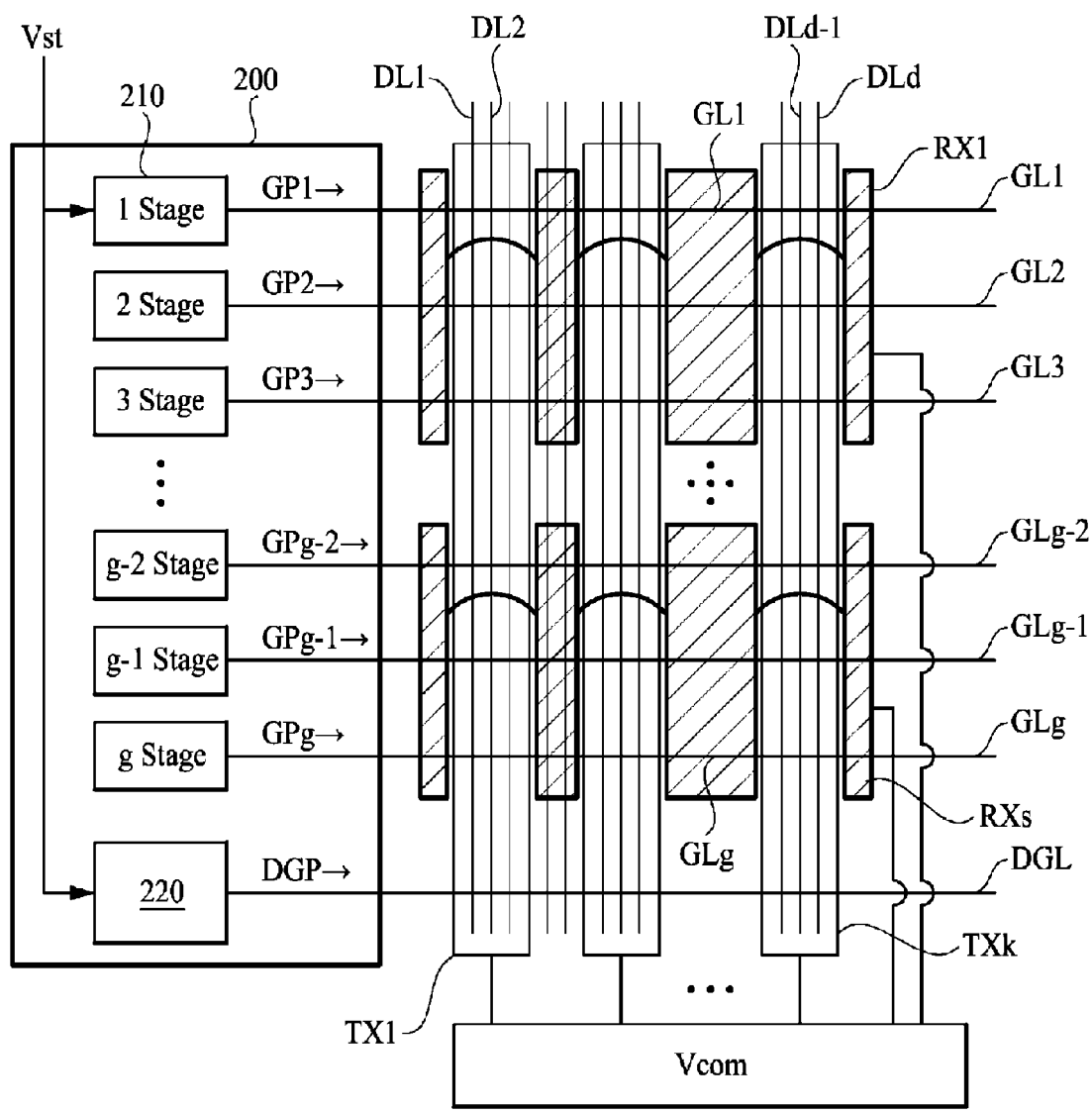
FIG. 5 is a diagram illustrating other configurations of the gate driver and the touch panel which are applied to the liquid crystal display device according to another embodiment of the present disclosure.

FIG. 5 is a diagram illustrating other configurations of the gate driver and the touch panel which are applied to the liquid crystal display device according to another embodiment of the present disclosure. The configuration of the liquid crystal display device illustrated in FIG. 5 is similar to the configuration of the liquid crystal display device illustrated in FIG. 4, except for the configuration of the gate driver 200.

The gate driver 200 implemented in the liquid crystal display device according to another embodiment of the present disclosure includes stages 210 that sequentially output the gate pulses GP1 to GPg to the gate lines GL1 to GLg, and at least one dummy stage 220 that outputs the dummy gate pulse DGP.

Each of the stages 210 is driven by a gate pulse output from the preceding state, and outputs a gate pulse to a gate line. Each stage 210 is connected to the corresponding each gate line. Each stage 210 is configured to receive a gate pulse output from the preceding state. As described above, the order that the gate pulse is output to the gate lines can be varied differently.

The dummy stage 220 is formed separately from the stages 210, and thus outputs the dummy gate pulses at the timing at which the gate pulses are output from the stages 210.

For example, when a first stage outputs a first gate pulse GP1 in response to a start signal Vst transmitted from the timing controller 400, the dummy stage 220 is also driven in response to the start signal Vst and outputs the dummy gate pulse DGP. In this case, the dummy gate pulse DGP has an inverted waveform of the first gate pulse GP1.

When a second gate pulse GP2 is output after the first gate pulse GP1 is output, the dummy stage 220 outputs the dummy gate pulse DGP again.

The dummy stage 220 starts its driving operation in response to the start signal Vst, and outputs the dummy gate pulse DGP having inverted waveforms of the gate pulses to the dummy gate line DGL whenever the gate pulses GP1 to GPg are output.

Figure 6:
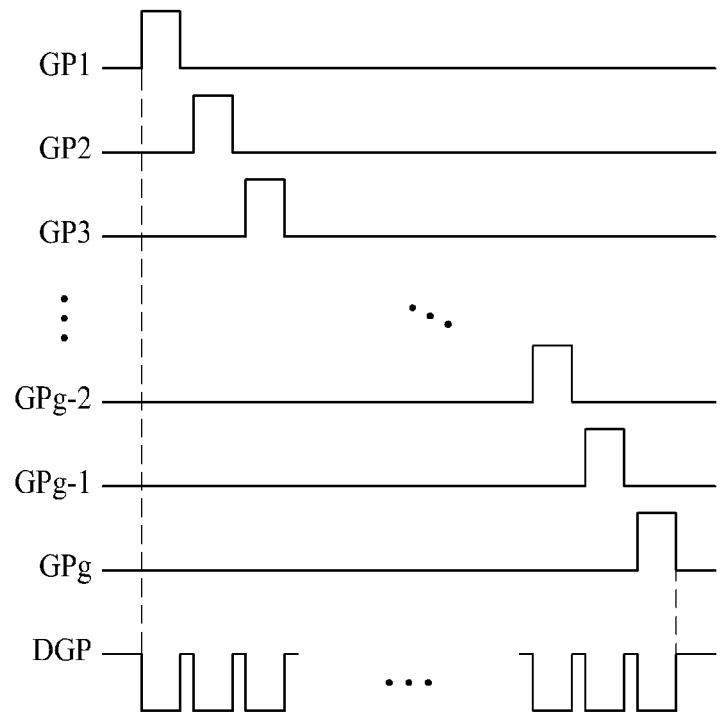
FIG. 6 is a timing diagram illustrating signals which are output from the gate driver applied to the liquid crystal display device according to embodiments of the present disclosure.
Figure 7:
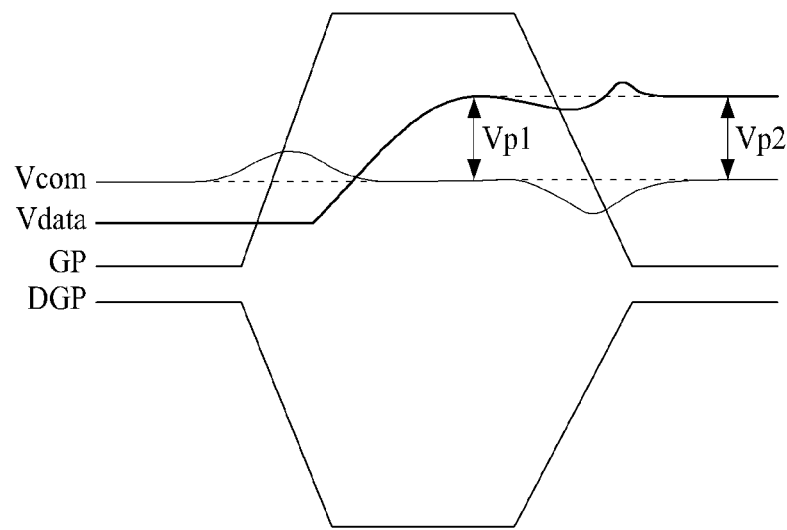
FIG. 7 is a diagram illustrating waveforms of signals which are applied to the liquid crystal display device according to embodiments of the present disclosure.

FIG. 6 is a timing diagram illustrating signals which are output from the gate driver applied to the liquid crystal display device according to some embodiments of the present disclosure, and FIG. 7 is a diagram illustrating waveforms of signals which are applied to the liquid crystal display device according to some embodiments of the present disclosure.

Referring to FIG. 6, the gate driver 200 which is applied to the liquid crystal display device according to some embodiments of the present disclosure sequentially outputs a first gate pulse GP1 to a gth gate pulse GPg to the first gate line GL1 to the gth gate line GLg. In this case, as described above, the order of the gate lines to which the gate pulse is output can be changed.

The gate pulses GP1 to GPg are output from the stages 1st Stage to gth Stage. The gate driver 200 outputs the dummy gate pulses DGP having inverted waveforms of the gate pulses to the dummy gate line DGL. The dummy gate pulses DGP are output from the dummy stage 220. Since the dummy gate line DGL overlaps all the driving electrodes TX1 to TXk, the dummy gate pulse affects the driving electrodes.

Accordingly, the coupling effect of the gate pulse that affects the driving electrodes is cancelled by the coupling effect of the dummy gate pulse that affects the driving electrodes. As a result, a variation of a pixel voltage due to a variation of a common voltage supplied to the driving electrodes is reduced or effectively suppressed. Accordingly, the degree of the undesired striped patterns being shown on the display screen is reduced when the luminance of pixels overlapped with the driving electrodes increases or decreases.

For example, referring to FIG. 7, a common voltage Vcom is supplied to the driving electrodes TX1 to TXk in the image display period.

When the gate pluses GP1 to GPg are sequentially output to the gate lines, the data voltages Vdata are supplied to the pixel electrodes that are formed in the pixels overlapped with the driving electrodes via the data lines.

Liquid crystal with respect to the pixels is driven based on the difference value Vp1 between the data voltage Vdata and the common voltage Vcom to control the light transmittance of the liquid crystal.

In this case, the gate pulse GP is output in a period corresponding to one horizontal period in a period of one frame. Accordingly, referring to FIG. 7, the gate pulse GP falls after one horizontal period elapses.

In a liquid crystal display device according to the related art, when the gate pulse GP falls, the common voltage Vcom that is supplied to the driving electrode is coupled to the gate pulse and initially falls and then rises, and the data voltage Vdata that is supplied to the pixel electrode is coupled to the common voltage Vcom and also falls and then rises. In this case, a pixel voltage corresponding to a difference value between the common voltage and the data voltage varies and thus the luminance of the pixels overlapped with the driving electrodes varies. As a result, striped patterns appear on the display screen along the driving electrodes. The striped patterns due to the coupling effect, as described above, may appear on the display screen along the receiving electrodes RX1 to RXs that are arranged parallel to the gate lines GL1 to GLg, but appear more prominently along the driving electrodes that are arranged to be perpendicular to the gate lines.

However, according to embodiments of the present invention, the dummy gate pulses DGP are output to the dummy gate line whenever the gate pulses GP1 to GPg are output to the gate lines.

Referring to FIG. 7, the waveform of the dummy gate pulse DGP, is opposite to the waveform of the gate pulse GP (e.g., inverted waveform of the gate pulse GP).

Accordingly, the coupling effect of the gate pulse GP that affects the driving electrodes TX1 to TXk can be cancelled by the coupling effect of the dummy gate pulse GP that affects the driving electrodes TX1 to TXk. As a result, a variation of the common voltage Vcom supplied to the driving electrodes is reduced, and a variation of the data voltage Vdata is also reduced. Accordingly, the difference between a pixel voltage Vp1 while the gate pulse is output and a pixel voltage Vp2 after the gate pulse falls may be zero or a very small value.

As a result, a luminance variation of the pixels overlapped with the driving electrodes TX1 to TXk is reduced, and thus the striped patterns do not appear on the display screen along the driving electrodes TX1 to TXk.

The features in the embodiments of the present invention described above can be expressed as follows.

In the liquid crystal display panel having an in-cell type touch panel, touch electrodes for carrying out a touch sensing function are added in addition to the configuration for outputting an image. In this case, a voltage distortion may occur in the touch electrodes, and thus a defect such as striped patterns may occur.

In case a touch panel is separately provided outside a liquid crystal display panel, the function of the liquid crystal display panel is different from the function of the touch panel and thus the liquid crystal display panel and the touch panel do not affect each other. However, in the liquid crystal display panel having an in-cell type touch panel, elements for outputting images and elements for sensing touch operations affect each other. For example, due to the gate pulses supplied to the gate lines, a common voltage supplied to the touch electrodes and a data voltage supplied to the pixel electrodes may vary. As a result, the pixel voltage can vary. If the pixel voltage varies, the luminance of an image or the like varies, thereby causing a defect such as a striped pattern being shown on the display screen.

The striped pattern, particularly, is more conspicuous along the touch electrodes that are formed to be perpendicular to the gate line.

To remove or reduce such striped patterns, in the embodiments of the present invention, at least one dummy gate line, which is used to transfer a dummy gate pulse having an inverted waveform of the gate pulse is output, is arranged to be parallel to the gate lines.

Liquid crystal panel according to embodiments of the present disclosure may include gate lines configured to transfer a gate pulse, data lines configured to transfer a data voltage, first touch electrodes configured to be parallel to the gate lines, to serve as a common electrode and to serve as a touch sensing structure, second touch electrodes configured to be perpendicular to the gate lines, to serve as a common electrode and to serve as a touch sensing structure and at least one dummy gate line configured to be parallel to the gate lines. The dummy gate line overlaps the second touch electrodes.

Liquid crystal display device according to some embodiments of the present disclosure may include a liquid crystal display panel in which gate lines, data lines, first touch electrodes that are parallel to the gate lines, second touch electrodes that are perpendicular to the gate lines, and at least one dummy gate line that is parallel to the gate lines are arranged, a touch sensing unit that supplies a common voltage to the first touch electrodes and the second touch electrodes during an image display period, and that sequentially supplies a touch drive signal to the first touch electrodes or the second touch electrodes, receives the sensed signals transmitted from the first electrodes or the second touch electrodes, and determines whether a touch contact or operation has occurred during a touch sensing period and a gate driver that sequentially outputs gate pulses to the gate lines during the image display period, and that outputs dummy gate pulses having an inverted waveform of the gate pulses to the dummy gate line whenever the gate pulses are output to the gate lines.

The dummy gate line overlaps the second touch electrodes. The dummy gate line is arranged on an outermost side of a display area of the liquid crystal display panel or is arranged inside the display area. The gate driver includes stages that output the gate pulses to the gate lines, and at least one dummy stage that outputs the dummy gate pulse.

The dummy stage inverts the gate pulses output from the stages to generate the dummy gate pulses.

A substrate according to embodiments of the present disclosure may include a plurality of driving electrodes configured to receive a common voltage, a plurality of gate lines configured to receive gate pulses and at least one dummy gate line configured to effectively suppress variations in pixel voltage due to variations in the common voltage supplied to the driving electrodes, said dummy gate line arranged in parallel to the gate lines and configured to transfer dummy gate pulses whenever the gate pulses are output, the dummy gate pulses having an inverted waveform of the gate pulses, whereby a coupling effect of the gate pulses that affect the driving electrodes is effectively canceled by a coupling effect of the dummy gate pulses that affect the driving electrodes due to said dummy gate line being configured to traverse all the driving electrodes.

At least one dummy gate line is at a sequential end of the plurality of gate lines having a parallel arrangement. A plurality of dummy gate lines is arranged with one or more of the plurality of gate lines in between adjacent dummy gate lines.

A circuit according to embodiments of the present disclosure may include a gate driver configured to sequentially output gate pulses to gate lines during an image display period, and to output dummy gate pulses having an inverted waveform of the gate pulses to at least one dummy gate line whenever the gate pulses are output to the gate lines, said gate driver including stages that output the gate pulses to the gate lines and at least one dummy stage that outputs the dummy gate pulses upon inverting the gate pulses output from the stages.

The gate driver is configured to allow a coupling effect of the gate pulses that affect driving electrodes to be effectively canceled by a coupling effect of the dummy gate pulses that affect the driving electrodes due to said dummy gate line being configured to traverse all the driving electrodes. The gate driver is implemented in a display device having touch screen capabilities.

According to the embodiments of present disclosure, an influence of the gate pulse on the pixel voltage and the data voltage can be cancelled or reduced by an influence of the dummy gate pulse on the pixel voltage and the data voltage. Accordingly, the pixel voltage of the pixels that overlap the touch electrodes arranged to be perpendicular to the gate lines does not vary. As a result, striped patterns do not appear on the display screen along the touch electrodes arranged to be perpendicular to the gate lines.

Those skilled in the art can understand that the present disclosure can be implemented in other specific embodiments without departing from the technical concept or features of the present disclosure. Accordingly, it should be understood that the above-mentioned embodiments are exemplary but not definitive in all aspects. The scope of the present disclosure is described by the appended claims, and it should be understood that all changes and modifications derived from the meaning, scope, and equivalent concept of the claims belong to the scope of the present disclosure.

What is claimed is:

1. A liquid crystal display panel comprising:
   gate lines configured to transfer a gate pulse;
   data lines configured to transfer a data voltage;
   first touch electrodes configured to be parallel to the gate lines, to serve as a common electrode and to serve as a touch sensing structure;
   second touch electrodes configured to be perpendicular to the gate lines, to serve as a common electrode and to serve as a touch sensing structure; and
   at least one dummy gate line configured to be parallel to the gate lines, overlap the data lines and the second touch electrodes, and receive a dummy gate pulse having an inverted waveform of the gate pulse.

2. The liquid crystal display device according to claim 1, wherein the dummy gate line is an outermost side of a display area of the display or is arranged inside the display area.

3. The liquid crystal display device according to claim 2, wherein one dummy gate line is at sequential end of the gate lines having a parallel arrangement.

4. The liquid crystal display device according to claim 1, wherein the first touch electrodes overlapped with two or more gate lines and the second touch electrodes overlapped with two or more data lines.

5. A liquid crystal display device comprising:
   a liquid crystal display panel in which gate lines, data lines, first touch electrodes that are parallel to the gate lines, second touch electrodes that are perpendicular to the gate lines, and at least one dummy gate line that is parallel to the gate lines and overlaps the data lines and the second touch electrodes are arranged;
   a touch sensing unit that supplies a common voltage to the first touch electrodes and the second touch electrodes during an image display period, and that sequentially supplies a touch drive signal to the first touch electrodes or the second touch electrodes, receives the sensed signals transmitted from the first electrodes or the second touch electrodes, and determines whether a touch contact or operation has occurred during a touch sensing period; and
   a gate driver that sequentially outputs gate pulses to the gate lines during the image display period, and that outputs dummy gate pulses having an inverted waveform of the gate pulses to the dummy gate line whenever the gate pulses are output to the gate lines.

6. The liquid crystal display device according to claim 5, wherein the dummy gate line is arranged on an outermost side of a display area of the liquid crystal display panel or is arranged inside the display area.

7. The liquid crystal display device according to claim 5, wherein the gate driver includes stages that output the gate pulses to the gate lines, and at least one dummy stage that outputs the dummy gate pulse.

8. The liquid crystal display device according to claim 7, wherein the dummy stage inverts the gate pulses output from the stages to generate the dummy gate pulses.

9. The liquid crystal display device according to claim 7, wherein when a first stage output a first gate pulse in response to a start signal transmitted from a timing controller, the dummy stage is also driven in response to the start signal and output the dummy gate pulse having an inverted waveform of the first gate pulse.

10. The liquid crystal display device according to claim 9, wherein when a second gate pulse is output after the first gate pulse is output, the dummy stage outputs the dummy gate pulse again.

11. A substrate comprising:
   a plurality of driving electrodes configured to receive a common voltage;
   a plurality of data lines configured to receive data voltages;
   a plurality of gate lines configured to receive gate pulses; and at least one dummy gate line configured to traverse the data lines and the driving electrodes and to effectively suppress variations in pixel voltage due to variations in the common voltage supplied to the driving electrodes, said dummy gate line arranged in parallel to the gate lines and configured to transfer dummy gate pulses whenever the gate pulses are output, the dummy gate pulses having an inverted waveform of the gate pulses, whereby a coupling effect of the gate pulses that affect the driving electrodes is effectively canceled by a coupling effect of the dummy gate pulses that affect the driving electrodes due to said dummy gate line being configured to traverse all the driving electrodes.

12. The substrate of claim 11, wherein the at least one dummy gate line is at a sequential end of the plurality of gate lines having a parallel arrangement.

13. The substrate of claim 12, wherein the only one dummy gate line is an outermost side of a display area of the display.

14. The substrate of claim 11, wherein a plurality of dummy gate lines are arranged with one or more of the plurality of gate lines in between adjacent dummy gate lines.

15. A circuit comprising:
a gate driver configured to sequentially output gate pulses to gate lines during an image display period, and to output dummy gate pulses having an inverted waveform of the gate pulses to at least one dummy gate line whenever the gate pulses are output to the gate lines,
said gate driver including stages that output the gate pulses to the gate lines and at least one dummy stage that outputs the dummy gate pulses upon inverting the gate pulses output from the stages in response to a start signal transmitted from a timing controller and simultaneously applied to the stages and the at least one dummy stage.

16. The circuit of claim 15, wherein the gate driver is configured to allow a coupling effect of the gate pulses that affect driving electrodes to be effectively canceled by a coupling effect of the dummy gate pulses that affect the driving electrodes due to said dummy gate line being configured to traverse all the driving electrodes.

17. The circuit of claim 16, wherein the gate driver is implemented in a display device having touch screen capabilities.

18. The display device according to claim 15, wherein the dummy stage starts driving operation in response to the start signal.

* * * * *